United States Patent [19]

Blume

[11] Patent Number: 5,910,060
[45] Date of Patent: Jun. 8, 1999

[54] TRANSMISSION

[76] Inventor: David B. Blume, 2970 N. Highway 61, Troy, Mo. 63379

[21] Appl. No.: 09/035,715

[22] Filed: Mar. 5, 1998

[51] Int. Cl.[6] .................................................... B60K 6/00
[52] U.S. Cl. ............................................ 475/28; 475/221
[58] Field of Search ............................... 475/18, 28, 221, 475/225

[56] References Cited

U.S. PATENT DOCUMENTS

| | | | |
|---|---|---|---|
| 1,295,335 | 2/1919 | Littlejohn | 475/221 |
| 1,340,306 | 5/1920 | Truscott . | |
| 1,344,107 | 6/1920 | Wilkin | 475/225 X |
| 1,403,994 | 1/1922 | Wegmann | 475/221 X |
| 1,468,338 | 9/1923 | Wyman | 475/221 |
| 2,262,710 | 11/1941 | Lang | 475/221 X |
| 3,176,546 | 7/1962 | Johnson | 74/665 |
| 3,256,949 | 6/1966 | Petersen | 180/6.66 |
| 3,439,559 | 4/1969 | Binger et al. | 475/28 |
| 3,530,741 | 9/1970 | Charest | 74/675 |
| 3,601,211 | 8/1971 | Finke | 180/6.66 |
| 4,700,589 | 10/1987 | Coronel | 74/705 |
| 4,706,517 | 11/1987 | Garrett | 475/225 X |
| 4,762,022 | 8/1988 | Johnshoy | 475/221 X |
| 4,977,970 | 12/1990 | Steiger | 180/6.2 |
| 5,006,101 | 4/1991 | Troung | 475/221 |
| 5,139,465 | 8/1992 | Sato | 475/28 X |
| 5,176,589 | 1/1993 | Borgudd | 475/221 |
| 5,509,491 | 4/1996 | Hall, III | 475/28 X |
| 5,571,058 | 11/1996 | Schmidt | 475/28 X |
| 5,662,009 | 9/1997 | Palmer | 475/221 X |
| 5,785,622 | 7/1998 | Perry | 475/221 X |

*Primary Examiner*—Khoi Q. Ta
*Attorney, Agent, or Firm*—Senniger, Powers, Leavitt & Roedel

[57] ABSTRACT

A transmission particularly a vehicular transmission for the driving and steering of a vehicle comprising a first differential having outputs to left and right wheels of the vehicle and an input powered for forward and reverse propulsion of the vehicle and a second differential controlling the outputs of the first differential for steering the vehicle.

10 Claims, 1 Drawing Sheet

TRANSMISSION

BACKGROUND OF THE INVENTION

This invention relates to transmissions and more particularly to a vehicular transmission for the driving and steering of a vehicle. Insofar as the invention relates to such vehicular transmissions, it is generally in the same field as that of the inventions disclosed in the following United States Patents:

| Number    | Issue Date         |
|-----------|--------------------|
| 3,176,546 | April 6, 1965      |
| 3,256,949 | June 21, 1966      |
| 3,530,741 | September 29, 1970 |
| 3,601,211 | August 24, 1971    |
| 4,700,589 | October 20, 1987   |
| 4,977,970 | December 18, 1990  |

BRIEF SUMMARY OF THE INVENTION

Among the several objects of the invention may be noted the provision of an improvement in transmissions for efficiently and reliably driving first and second output shafts:

a. Both in one direction at the same speed;

b. Both in the opposite direction at the same speed;

c. The first in one direction and the second in the opposite direction;

d. The second in said one direction and the first in said opposite direction;

e. Both in one direction at different speeds; and f. Both in the opposite direction at different speeds.

Also among the several objects of the invention may be noted the provision of such a transmission which is relatively easily constructed, being adapted for construction using standard off-the-shelf parts; the provision of such a transmission, or a transmission employing chains, sprockets, belt pulleys, etc., of high reliability (all gears and/or other driveline components thereof being in constant mesh); the provision of such a transmission which is relatively easy to repair if needed; and the provision of such a transmission for driving and steering a vehicle, the output shafts driving the wheels or other traction devices of the vehicle for forward or rearward propulsion of the vehicle, and for steering purposes when the vehicle is being propelled forward or rearward, driving the first wheel or traction device and the second wheel or traction device at different speeds, and for steering purposes when the vehicle is at rest (e.g. parked), driving the first wheel or traction device and the second wheel or traction device in opposite directions; and the provision of such a vehicular transmission affording excellent maneuverability, with excellent and continuous traction on the drive wheels or other traction devices of the vehicle regardless of turning position or surface conditions.

In general, a transmission of this invention, comprises a first differential having a first and a second output shaft, each rotatable on a first axis, a first output gear on the first output shaft, a second output gear on the second output shaft, a first planetary gear carrier rotatable in one direction or the other about the stated first axis, and at least one planetary gear carried by the first carrier for rotation with the carrier in one direction or the other about the first axis in mesh with the first output gear and with the second output gear. The first planetary gear carrier is adapted to be power driven in one direction or the other for driving the first and second output shafts both in one direction or both in the opposite direction about the first axis. The transmission further comprises a second differential having a third and a fourth output shaft, each rotatable on a second axis, a third output gear on the third output shaft, a fourth output gear on the fourth output shaft, a second planetary gear carrier rotatable in one direction or the other about the second axis, and at least one planetary gear carried by the second carrier for rotation with the second carrier in one direction or the other about the second axis in mesh with the third and fourth output gears. The second planetary gear carrier is adapted to be driven in one direction or the other about the second axis for driving the third and fourth output shafts both in one direction or both in the opposite direction about the second axis. The transmission further comprises a first drive from the third output shaft to the first output shaft, and a second drive from the fourth output shaft to the second output shaft with the second drive operable in reverse to the first drive.

Other objects and features will be in part apparent and in part pointed out hereinafter.

BRIEF DESCRIPTION OF THE DRAWING

The single FIGURE of the drawing is a semi-diagrammatic plan of a three-wheeled vehicle equipped with a driving and steering transmission of this invention.

DETAILED DESCRIPTION

Figure 1:
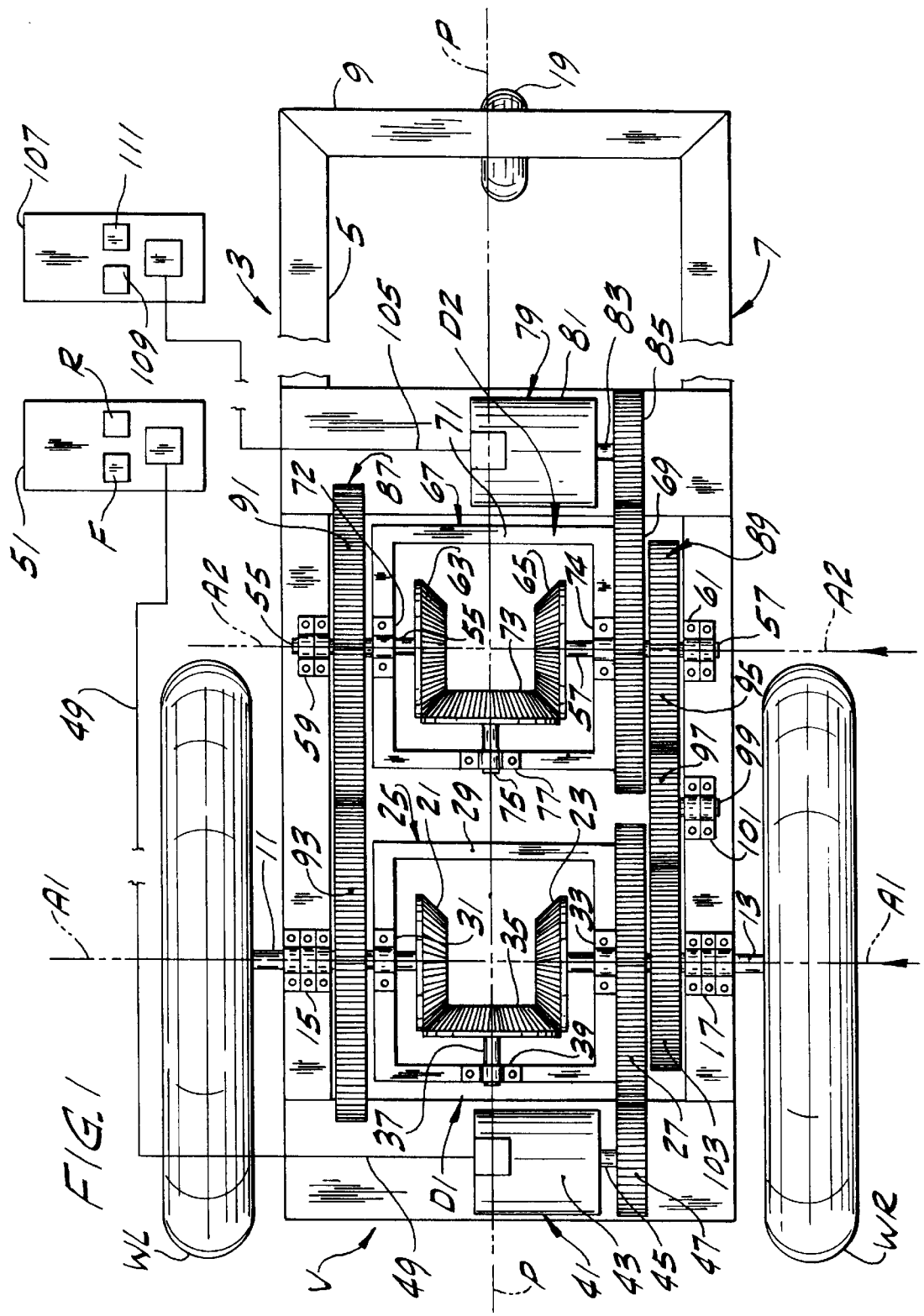

Referring to the drawing, a transmission of this invention is shown in its installation on a wheeled vehicle V for the driving and steering of the vehicle. As shown, the transmission comprises a first differential designated in its entirety by the reference character D1 constituting a drive for driving the left and right rear wheels WL and WR of the vehicle for forward or reverse propulsion of the vehicle, and a second differential D2 constituting a steering control for operation of the wheels for steering the vehicle either left or right in either its forward or rearward travel or when the vehicle is at rest. The vehicle V is diagrammatically illustrated as having a frame generally designated 3 having left and right side rails 5 and 7 and a front end rail 9, with the left and right rear wheels WL and WR on left and right axles 11 and 13 journalled for rotation in left and right bearings 15 and 17 on the left and right side rails, respectively, adjacent the rear of the frame for rotation on an axis A1, which is referred to as the first axis, extending transversely of the frame adjacent its rear. The axles 11 and 13 are aligned on axis A1 with their inner ends spaced apart on opposite sides of the central vertical longitudinal plane P of the vehicle and constitute output shafts of the drive differential D1, being referred to as the first and second output shafts of the transmission. By way of illustration, the vehicle is a three-wheeled vehicle having a caster 19 at the center of the front end 9 of the frame as the third wheel.

The illustration of the vehicle as a three-wheeled vehicle is by way of example. It is contemplated that the vehicle may be a four-wheeled vehicle, or one having traction devices other than wheels, e.g. endless-track type traction devices, driven by the output shafts.

The first differential D1 is operable for driving both the first and second output shafts and the respective wheels WL and WR in one direction, viz. forward direction, for forward propulsion of the vehicle or for driving both said output shafts in the opposite direction, viz. rearward direction, for rearward propulsion of the vehicle. The wheels may be driven forward at the same speed or rearward at the same speed. As will appear, the steering differential D2 is operable for steering purposes for effecting driving of the first output shaft 11 and the wheel WL in one direction and the second output shaft 13 and the wheel W2 in the opposite direction, and for effecting driving of the second output shaft 13 and the wheel WR and in said one direction and the first output shaft 11 and wheel WL in said opposite direction. The steering differential D2 is also operable for steering purposes for effecting driving of both output shafts 11 and 13 both in one direction at different speeds, and thus driving wheels WL and WR in said one direction at different speeds, and for effecting driving of both shafts 11 and 13 both in the opposite direction at different speeds, and thus driving wheels WL and WR in said opposite direction at different speeds.

The first differential D1 comprises a first output gear 21 on what constitutes the inner end of the first output shaft 11, and a second output gear 23 on what constitutes the inner end of the second output shaft 13. Each of these output gears is a bevel gear, constituting what may be termed sun gears of the differential. The first differential D1 further comprises a planetary gear carrier 25, which may be referred to as the first planetary gear carrier of the transmission, rotatable in one direction or the other about the stated first axis A1, being shown as including a spur gear 27, which may be referred to as the input gear of differential D1, rotatably mounted on the second output shaft 13 by means of a suitable bearing, and a frame structure 29 extending from and rotatable with the gear 27 coaxially therewith. The frame structure 29 is attached to the gear 27 for rotation therewith and is shown as rotatably mounted on shafts 11 and 13 by means of bearings 31 and 33. The stated first planetary gear carrier 25 carries a planetary gear 35 for rotation with the carrier in one direction or the other about the axis A1, this planetary gear being a bevel gear having a shaft 37 journalled in a bearing 39 on the structure 29 for rotation with structure 29 around the axis A1 and for rotation relative to structure 29 on an axis at right angles to axis A1, said gear 35 being in mesh with the stated first and second output gears 21 and 23. Thus, structure 29 constitutes a support rotatable with gear 27 carrying the planetary gear.

At 41 is generally indicated means for power driving the planetary gear carrier 25 in one direction, which may be referred to as forward direction, or the other direction, which may be referred to as reverse direction, for driving the first and second output shafts 11 and 13 and wheels WL and WR both in forward direction for forward propulsion of the vehicle or both in reverse direction about axis A1 for reverse propulsion of the vehicle. This means may, for example, comprise a reversible electric motor drive 43 having a shaft 45 carrying a pinion 47 in mesh with the gear 27. The motor is connected in a circuit 49 including a control 51 having a button F which when pressed effects operation of the motor 43 in the direction for driving the input gear 27, the planetary gear support 29 and the planetary gear 35 in what may be referred to as forward direction (clockwise as viewed in the direction of the arrow shown at the lower left in the drawing on axis A1), and having a button R which when pressed effects operation of the motor 43 in the opposite direction for driving the gear 27, the planetary gear support 29 and the planetary gear 35 in the opposite direction, which may be referred to as reverse direction (counterclockwise as viewed in the direction of the arrow). The arrangement is such that on pushing button F, thereby operating the motor 43 to drive the planetary gear carrier 25 in the stated forward direction, with wheels WL and WR on a supporting surface, the gears 31 and 33 and the output shafts 11 and 13 and the wheels WL and WR are driven in forward direction (clockwise as viewed in the direction of said arrow) for forward propulsion of the vehicle V, and on pushing button R, thereby operating the motor 43 to drive the planetary gear carrier 25 in the stated reverse direction, the gears 31 and 33 and the output shafts 11 and 13 and the wheels WL and WR are driven in reverse direction (counterclockwise as viewed in the direction of said arrow) for reverse propulsion of the vehicle V.

The second differential D2, illustrated as located forward of the first differential D1 on the vehicle V, has an output shaft 55, referred to as the third output shaft of the transmission, and an output shaft 57, referred to as the fourth output shaft of the transmission, each rotatable on an axis A2 referred to as the second axis, spaced forward of and parallel to the stated first axis A1. The shafts 55 and 57 are aligned on axis A2 with their inner ends spaced apart on opposite sides of the central vertical longitudinal plane P of the vehicle. Shaft 55 is journalled in a bearing 59 on the left-hand side rail 5 of the frame; shaft 57 is journalled in a bearing 61 on the right-hand side rail of the frame. Differential D2 is operable for driving both said third and fourth output shafts 55 and 57 in one direction, referred to as the steering-left direction, or both in the opposite direction, referred to as the steering-right direction. It comprises an output gear 63, referred to as the third output gear, on what constitutes the inner end of said third output shaft 55, and another output gear 65, referred to as the fourth output gear, on what constitutes the inner end of said fourth output shaft 57. Each of the output gears 63 and 65 is a bevel gear, constituting what may be termed sun gears of the second differential. The second differential D2 further comprises a planetary gear carrier 67, which may be referred to as the second planetary gear carrier of the transmission, rotatable in one direction or the other about the stated second axis A2, being shown as including a spur gear 69, which may be referred to as the input gear of the second differential, rotatably mounted on the fourth output shaft 57 by means of a suitable bearing, and a frame structure extending from and rotatable with the gear 69 coaxially therewith. The frame structure 71 is attached to the gear 69 for rotation therewith and is shown as rotatably mounted on shafts 55 and 57 by means of bearings 72 and 74. The stated second planetary gear carrier 67 carries a planetary gear 73 for rotation with the carrier 67 in one direction or the other about the axis A2, this planetary gear 73 being a bevel gear having a shaft 75 journalled in a bearing 77 on the frame structure 71 for rotation with the frame structure 71 around the axis A2 and for rotation relative to the frame structure 71 on an axis at right angles to axis A2, said gear 73 being in mesh with the stated third and fourth output gears 63 and 65.

At 79 is generally indicated means for driving the planetary gear carrier 67 of the second differential D2 (the "second" planetary gear carrier) in one direction, referred to as the steering-left direction, or in the opposite direction, referred to as the steering-right direction. This means may, for example, comprise a reversible electric motor drive unit 81 having its output shaft 83 carrying a pinion 85 in mesh with the spur gear 69 constituting the input gear of the second planetary gear carrier 79. The arrangement is such that by controlling the motor 81 to drive the second planetary gear carrier 79 in the stated steering-left direction, the output shafts 55 and 57 are both driven in one direction (the steering-left direction) and by controlling the motor 81 to drive the second planetary gear carrier 79 in the stated steering-right direction, the output shafts 55 and 57 are both driven in the opposite direction (the steering-right direction).

At 87 is indicated a drive from the output shaft 55 of differential D2 (the stated third output shaft) to the output shaft 11 of differential D1 (the stated first output shaft). At 89 is indicated a drive from the output shaft 57 of differential D2 (the stated fourth output shaft) to the output shaft 13 of differential D1 (the stated second output shaft). Drive 87 may be referred to as the first drive from D2 to D1 and drive 89 may be referred to as the second drive from D2 to D1. The first and second drives 87, 89 are operable in reverse, one to the other. The relationship may also be stated as the second drive 89 being operable in reverse to the first drive 87. The first drive 87 is shown as comprising a spur gear 91 keyed on shaft 55 in mesh with a spur gear 93 keyed on shaft 11. The second drive 89 is shown as comprising a spur gear 95 keyed on shaft 57 in mesh with an idler pinion gear 97 on a shaft 99 journalled in a bearing 101 on the right-hand side rail 7 of the frame 3, the pinion 97 being in mesh with a spur gear 103 keyed on the second output shaft 13. The arrangement is such that when the vehicle is at rest (motor 43 deenergized) and the motor 81 is operated to drive the second planetary gear carrier, gears 63 and 65 and the third and fourth output shafts 55 and 57 clockwise as viewed from the right side of the vehicle, shaft 11 and wheel WL are rotated counterclockwise direction (as viewed from the right side of the vehicle) via shaft 55 and gears 91 and 93, and shaft 13 and wheel WR are driven in clockwise direction via shaft 57 and gears 95, 97 and 108 for steering the vehicle to the left. Alternatively, when the vehicle is at rest and the motor 81 is operated to drive the third and fourth output shafts 55 and 57 counterclockwise (as viewed from the right side of the vehicle) shaft 11 and wheel WL are driven clockwise direction via shaft 55, and gears 91 and 93, and shaft 13 and wheel WR are driven in counterclockwise direction via shaft 57 and gears 95, 97 and 103 for steering the vehicle to the right. Here it may be noted that with the drive from shaft 55 to shaft 11 comprising gears 91 and 93, shaft 11 is driven in the opposite direction from shaft 55, and with the drive from shaft 57 to shaft 13 comprising gears 95, idler 97 and gear 103, shaft 13 is driven in the same direction as shaft 57. Thus, the one drive 87 or 89 may be referred to as the reverse of the other, 89, 87.

The motor 81 is connected in a circuit 105 including a control 107 having a button 109 which when pressed effects operation of the motor 81 in the direction for driving the input gear 69, the planetary gear support 71 and the planetary gear 73 in what may be referred to as the steering-left direction (clockwise as viewed in the direction of the arrow shown in the drawing on axis A2), and having a button 111 which when pressed effects operation of the motor 81 in the opposite direction for driving the gear 69, the planetary gear support 71 and the planetary gear 73 in the opposite direction, which may be referred to as the steering-right direction (counterclockwise as viewed in the direction of said arrow).

When the wheels WL and WR are power driven in clockwise direction as viewed from the right side of the vehicle by motor 43 for forward propulsion of the vehicle, and the motor 81 is operated to power the third and fourth output shafts 55 and 57 clockwise as viewed from the right side of the vehicle, shaft 11 and wheel WL are powered in counterclockwise direction via shaft 55 and gears 91 and 93 with resultant deceleration (or even reversal) of wheel WL, and shaft 13 and wheel WR are driven to rotate in clockwise direction via shaft 57 and gears 95, 97 and 103 with resultant acceleration of wheel WR, for steering the vehicle to the left. Alternately, when the motor 81 is operated to power the third and fourth output shafts 55 and 57 counterclockwise as viewed from the right side of the vehicle, shaft 11 and wheel WL are driven in clockwise direction via shaft 55 and gears 91 and 93 with resultant acceleration of wheel WL, and shaft 13 and wheel WR are powered to rotate in counterclockwise direction via shaft 57 and gears 95, 97 and 103 with resultant deceleration (or even reversal) of wheel WR, for steering the vehicle to the right.

It will be readily understood that when the wheels WL and WR are power driven in counterclockwise direction as viewed from the right side of the vehicle for rearward propulsion of the vehicle, steering may be similarly effected by acceleration of wheel WL and deceleration (or reversal) of wheel WR to turn left in the rearward travel of the vehicle (i.e. in the direction of the right side of the vehicle) and by deceleration of wheel WL and acceleration of wheel WR to turn right in the rearward travel of the vehicle (i.e. in the direction of the left side of the vehicle).

In an application of the above to a toy vehicle constructed of LEGO parts such as catalogued in LEGO Shop At Home catalogs available from LEGO Shop At Home Series, 555 Taylor Road, P.O. Box 1310, Enfield, Conn. 06083-1310, motors 43 and 81 were LEGO #5114 9V motors each powered and under control of a LEGO 8720 Power Pack, the latter comprising a box containing batteries, and two button-operated switches, one for energizing the motor for rotation of the motor shaft in one direction and the other for rotation of the motor shaft in the other direction. As illustrated, the power pack for powering and controlling motor 43, which is indicated at 51, has a switch operated by button F for operation of the motor to drive shaft 45 for rotating the planetary gear carrier 25 of the first differential D1 in the direction for rotating wheels WL and WR clockwise as viewed from the right side of the vehicle for forward propulsion of the vehicle, and a switch operated by button R for operation of the motor to drive shaft 43 for rotating the planetary gear carrier 25 of the first differential D1 in the direction for rotating wheels WL and WR counterclockwise for rearward propulsion of the vehicle. Power pack 51 is connected to motor 43 via a relatively long cable allowing for travel of the vehicle a substantial distance from the power pack.

As illustrated, the power pack for powering and controlling motor 81, which is indicated at 109, has a switch operated by button 109 for operation of the motor 81 to drive shaft 93 for rotating the planetary gear support 71 of the second differential D2 in the steering-left direction and a switch operated by button 11 for operation of the motor 81 to drive shaft 93 for rotating the planetary gear support 71 of the second differential in the steering-right direction. Power pack 109 is connected to motor 81 via a relatively long cable allowing for travel of the vehicle a substantial distance from the power pack.

It is contemplated that the transmission of this invention may have nonvehicular as well as vehicular applications, and that its vehicular applications may include its use on earthmoving movement, forklift trucks and riding lawn mowers, for example, as well as on automotive vehicles. In such applications, means 41 may comprise an internal combustion engine, and means 79 may comprise a hydraulic motor (in the place of the electric motor drive units 43 and 81).

In view of the above, it will be seen that the several objects of the invention are achieved and other advantageous results attained.

As various changes could be made in the above constructions without departing from the scope of the invention, it is intended that all matter contained in the above description or shown in the accompanying drawing shall be interpreted as illustrative and not in a limiting sense.

What is claimed is:

1. A transmission comprising:

a first differential having a first and a second output shaft, each rotatable on a first axis;

said first differential comprising a first output gear on the first output shaft and a second output gear on the second output shaft;

said first differential further comprising a first planetary gear carrier rotatable in one direction or the other about said first axis, and at least one planetary gear carried by said first carrier for rotation with said carrier in one direction or the other about said first axis in mesh with said first and with said second output gears;

said first planetary gear carrier being adapted to be power driven in one direction or the other for driving said first and second output shafts both in one direction or both in the opposite direction about said first axis;

a second differential having a third and a fourth output shaft, each rotatable on a second axis;

said second differential comprising a third output gear on said third output shaft and a fourth output gear on said fourth output shaft;

said second differential further comprising a second planetary gear carrier rotatable in one direction or the other about said second axis, and at least one planetary gear carried by said second carrier for rotation with said second carrier in one direction or the other about said second axis in mesh with said third and fourth output gears;

said second planetary gear carrier being adapted to be driven in one direction or the other about said second axis for driving said third and fourth output shafts both in one direction or both in the opposite direction about said second axis;

a first drive from said third output shaft to said first output shaft; and a second drive from said fourth output shaft to said second output shaft with said second drive operable in reverse to said first drive.

2. A transmission as set forth in claim 1 wherein said first and second axes are parallel.

3. A transmission as set forth in claim 2 wherein said first and second output gears are bevel gears, wherein said first planetary gear carrier comprises a first input gear rotatably mounted on one of said first and second output shafts and a first planetary gear support rotatable with said first input gear, the planetary gear of said first differential being a bevel gear journalled on said first support for rotation on an axis perpendicular to said first axis and in mesh with said first and second output gears, and wherein said third and fourth output gears are bevel gears, wherein said second planetary gear carrier comprises a second input gear rotatably mounted on one of said third and fourth output shafts and a second planetary gear support rotatable with said second input gear, the planetary gear of said second differential being a bevel gear journalled in said second support for rotation on an axis perpendicular to said second axis and in mesh with said third and fourth output gears.

4. A transmission as set forth in claim 3 having a power drive for the first planetary gear carrier including a drive gear in mesh with the first input gear and a drive for the second planetary gear carrier including a drive gear in mesh with the second input gear.

5. A transmission as set forth in claim 1 wherein said first drive comprises a gear on third output shaft in mesh with a gear on said first output shaft and said second drive comprises a gear on said fourth output shaft in mesh with an idler gear in mesh with a gear on said second output shaft.

6. A transmission as set forth in claim 1 for the driving and steering of a vehicle having left and right traction devices wherein the left traction device is driven by the first output shaft and the right traction device is driven by the second output shaft, having a power drive for the first planetary gear carrier for driving both said first and second output shafts in said one direction for driving both traction devices in the direction for forward propulsion of the vehicle or both in said opposite direction for driving both traction devices in the direction for rearward propulsion of the vehicle, and having a steering control operable on the second planetary gear carrier for powering it in said one direction for powering said third and fourth output shafts both in the direction for powering one of the first and second output shafts in one direction and the other in the opposite direction for steering the vehicle in one direction, said steering control also being operable on the second planetary gear carrier for powering it in the opposite direction for powering said third and fourth output shafts both in the direction for powering the other of the first and second output shafts in said one direction and said one of said first and second output shafts in the opposite direction for operation of the traction devices at different speeds for steering the vehicle in the opposite direction.

7. A transmission as set forth in claim 6 wherein said first and second axes extend transversely of the vehicle in parallel one to the other.

8. A transmission as set forth in claim 7 wherein said first and second output gears are bevel gears, wherein said first planetary gear carrier comprises a first input gear rotatably mounted on one of said first and second output shafts and a first planetary gear support rotatable with said first input gear, the planetary gear of said first differential being a bevel gear journalled on said first support for rotation on an axis perpendicular to said first axis and in mesh with said first and second output gears, and wherein said third and fourth output gears are bevel gears, wherein said second planetary gear carrier comprises a second input gear rotatably mounted on one of said third and fourth output shafts and a second planetary gear support rotatable with said second input gear, the planetary gear of said second differential being a bevel gear journalled in said second support for rotation on an axis perpendicular to said second axis and in mesh with said third and fourth output gears.

9. A transmission as set forth in claim 8 having a power drive for the first planetary gear carrier including a drive gear in mesh with the first input gear and a drive for the second planetary gear carrier including a drive gear in mesh with the second input gear.

10. A transmission as set forth in claim 6 wherein said first drive comprises a gear on said third output shaft in mesh with a gear on said first output shaft and said second drive comprises a gear on said fourth output shaft in mesh with an idler gear in mesh with a gear on said second output shaft.

* * * * *